(12) United States Patent
Elliott

(10) Patent No.: US 10,595,632 B2
(45) Date of Patent: Mar. 24, 2020

(54) FURNITURE FRAME STRUCTURAL SYSTEM WITH INTERLOCKING MEMBERS

(71) Applicant: Peter Matheson Elliott, Baden, PA (US)

(72) Inventor: Peter Matheson Elliott, Baden, PA (US)

(*) Notice: Subject to any disclaimer, the term of this patent is extended or adjusted under 35 U.S.C. 154(b) by 303 days.

(21) Appl. No.: 15/598,985

(22) Filed: May 18, 2017

(65) Prior Publication Data
US 2018/0332960 A1 Nov. 22, 2018

(51) Int. Cl.
*E04B 1/19* (2006.01)
*A47B 47/04* (2006.01)
*F16B 12/16* (2006.01)
*A47B 87/02* (2006.01)
*A47B 85/00* (2006.01)

(52) U.S. Cl.
CPC .......... *A47B 47/047* (2013.01); *A47B 47/045* (2013.01); *A47B 87/0223* (2013.01); *F16B 12/16* (2013.01); *A47B 85/00* (2013.01); *A47B 2230/15* (2013.01); *Y10T 403/342* (2015.01)

(58) Field of Classification Search
CPC . A47B 47/045; A47B 47/047; A47B 2230/15; A47B 87/005; A47B 87/0223; A47B 85/00; A47B 47/0091; F16B 12/16; F16B 12/18; Y10T 403/342
See application file for complete search history.

(56) References Cited

U.S. PATENT DOCUMENTS

| 1,932,794 | A | * | 10/1933 | McArthur, Jr. | A47C 4/02 248/159 |
| 3,231,321 | A | * | 1/1966 | Barney | A47B 47/05 217/12 R |
| 3,307,505 | A | * | 3/1967 | Windross | A47B 47/042 108/180 |
| 3,589,784 | A | * | 6/1971 | Winkels | A47B 47/04 312/263 |
| 4,079,995 | A | * | 3/1978 | Beckley | A47C 3/00 297/440.18 |
| 4,923,202 | A | * | 5/1990 | Breveglieri | B62B 3/10 108/107 |

(Continued)

FOREIGN PATENT DOCUMENTS

EP 2100537 A1 * 9/2009 ............. A47B 88/90

*Primary Examiner* — Matthew R McMahon

(57) ABSTRACT

A furniture frame structural system with interlocking members includes a first face frame, a second face frame, and a plurality of frame members. At least one joining feature for each frame member allows the frame members to arrange into a skeletal configuration as the joining feature includes a male interlocking portion and a female interlocking portion. More specifically, the male interlocking portion for each frame member is engaged with the female interlocking portion of an adjacent member from the frame members. Resultantly, the frame members complete the skeletal configuration. The first face frame and the second face frame are then oppositely mounted to the skeletal configuration completing the basic frame structure. Additional components such as post-tensioned fasteners, inner liners, outer panels held in side rails, a top, legs, and baseboard can be optionally integrated with the basic frame structure to improve the functionality and appearance of the resulting furniture.

19 Claims, 20 Drawing Sheets

(56) References Cited

U.S. PATENT DOCUMENTS

| | | | | |
|---|---|---|---|---|
| 5,492,069 A | * | 2/1996 | Alexander | B65D 19/0069 108/53.3 |
| 5,678,706 A | * | 10/1997 | Husak | A47B 47/005 211/189 |
| 6,174,585 B1 | * | 1/2001 | Miles | A47B 85/00 297/118 |
| 7,780,018 B1 | * | 8/2010 | Sauder | A47B 96/00 108/147.16 |
| 7,984,680 B1 | * | 7/2011 | Tsai | A47B 87/0223 108/186 |
| 2008/0121144 A1 | * | 5/2008 | Chen | A47B 3/00 108/16 |

* cited by examiner

FURNITURE FRAME STRUCTURAL SYSTEM WITH INTERLOCKING MEMBERS

FIELD OF THE INVENTION

The present invention relates generally to the freestanding furniture industry. More specifically, the present invention is a furniture frame structural system that engages and interlocks multiple frame members to each other to create a vast range of furniture shapes and styles.

BACKGROUND OF THE INVENTION

Custom furniture and standard lines of furniture are constructed in factory setting and then shipped, either assembled or disassembled, to consumers or retail stores so that the furniture can be utilized according to the designated furniture type. For example, the furniture types can include, but are not limited to, bookcases, cabinets, armoires, dressers, desks, credenzas, entertainment centers, curios, shelving systems, benches, and casegoods of all kinds. Generally, a plurality of slabs is connected to each other through a different type of fasteners and different joining features as the overall shape of the assembly delineates the furniture style. The standard construction of such furniture (a set of connected slabs) makes it cost-prohibitive to produce furniture of custom sizes and necessitates an approach of mass production of furniture of predetermined sizes and styles. As a result, the current furniture industry is unable to offer individual customers furniture that is tailored to their specific needs in terms of dimensions, functionality, style and finish. Conventional furniture lacks the customized features that allows the users to create practical and efficient furniture that suit their specific requirements.

It is an objective of the present invention to provide a furniture frame structural system that enables the cost-effective manufacturing of furniture of a wide range of dimensions in a wide range of styles. At the same time, this system has numerous other advantages over the industry standard slab construction methodology, including reduced materials costs, reduced labor costs, increased strength and rigidity, increased durability, and a long list of "green" advantages, including the maximization of recycling of materials. The present invention comprises a plurality of frame members that is mechanically interlocked to each other while utilizing rotation preventing joints and post-tensioned fasteners. More specifically, the present invention differs from conventional furniture construction in two ways. (a) by utilizing end connections that are "fixed" (preventing rotation) and (b) by the use of beams and columns instead of slabs and (c) by utilizing unique connections that prevent rotation at joints, resulting in better use of the strength of materials to reduce material and labor requirements while increasing strength, rigidity and durability. In summary, the present invention is able to reduce manufacturing costs, shipping costs, storage spaces, and raw material usage while increasing the load capacity and structural integrity. Most importantly, it enables furniture to be cost-effectively manufactured in small local facilities producing small quantities of standard furniture lines as well as custom furniture, with production triggered by custom orders, without the current industry's large investment in tooling up for new product lines.

DETAILED DESCRIPTION OF THE INVENTION

All illustrations of the drawings are for the purpose of describing selected versions of the present invention and are not intended to limit the scope of the present invention.

Figure 1:
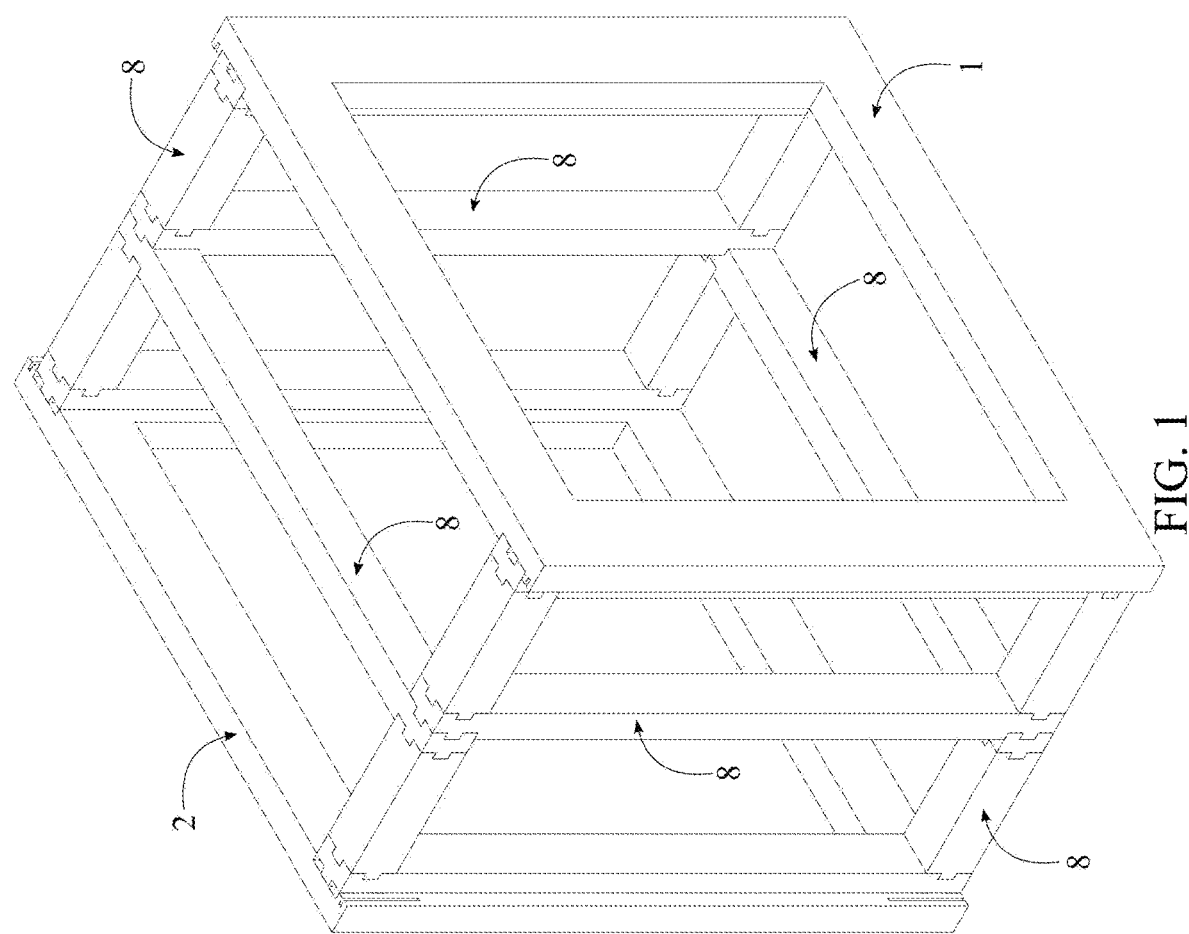
FIG. 1 is a perspective view for the skeletal configuration of the present invention.

The present invention is a furniture frame structural system that produces different specific furniture items, such as bookcases, cabinets, armoires, dressers, shelving systems, benches and casegoods of all kinds. More specifically, the present invention has mechanically interlocking joints at each interface, precisely fixing each member's relative location vertically and horizontally while preventing rotation at the joint. In reference to FIG. 1, the present invention comprises a first face frame 1, a second face frame 2, and a plurality of frame members 8 to complete the overall structure of the specific furniture item. The first face frame 1 and the second face frame 2 improve the quality and appearance of the specific furniture item and simplify the assembly process. The plurality of frame members 8 provides the internal structural integrity of the furniture item, and each of the plurality of frame members 8 comprises a member body 9 and at least one joining feature 10. The at least one joining feature 10 comprises a male interlocking portion 11 and a female interlocking portion 13 so that the plurality of frame members 8 can be arranged into a skeletal configuration within the present invention.

More specifically, the male interlocking portion 11 for each of the plurality of frame members 8 is engaged to the female interlocking portion 13 of an adjacent member from the plurality of frame members 8 to complete the skeletal configuration. The first face frame 1 is engaged and attached to the plurality of frame members 8 by a plurality of assembly features 3 of the first face frame 1. The second face frame 2 is engaged and attached to the plurality of frame members 8 by a plurality of assembly features 3 of the second face frame 2 and positioned opposite of the first face frame 1. As a result, the plurality of frame members 8, the first face frame 1, and the second face frame 2 are able to complete the specific furniture item.

Figure 2:
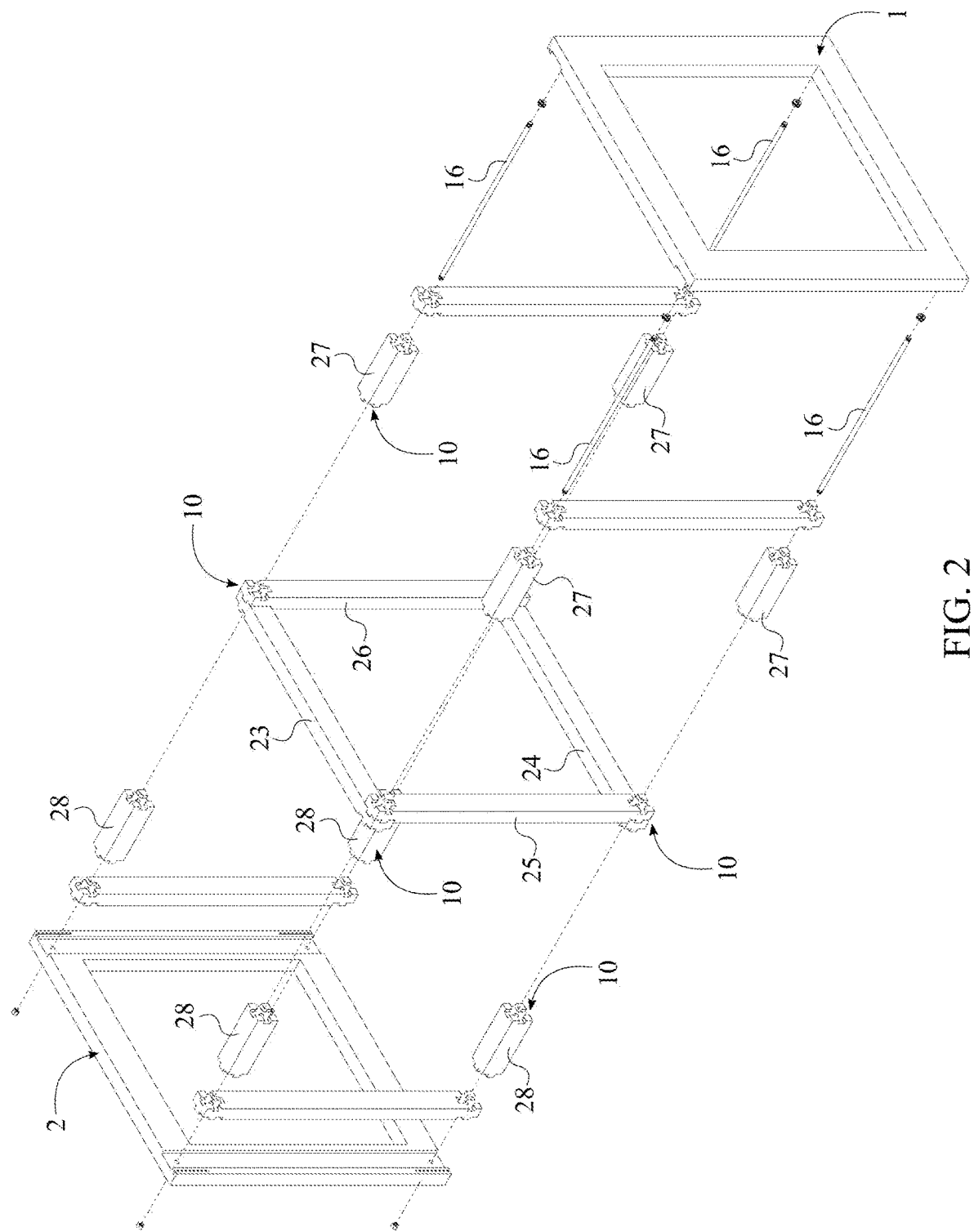
FIG. 2 is a partial exploded view for the single support frame of the present invention.
Figure 4:
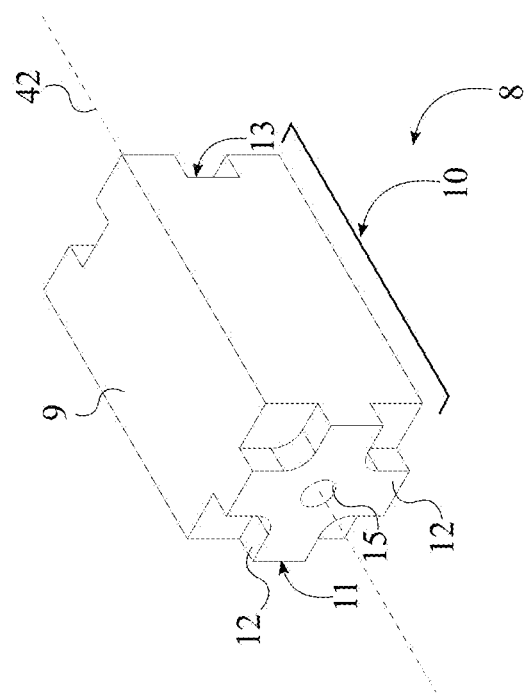
FIG. 4 is a perspective view showing the single joining feature within one of the frame member, wherein the viewed joining feature is the male interlocking portion.
Figure 3:
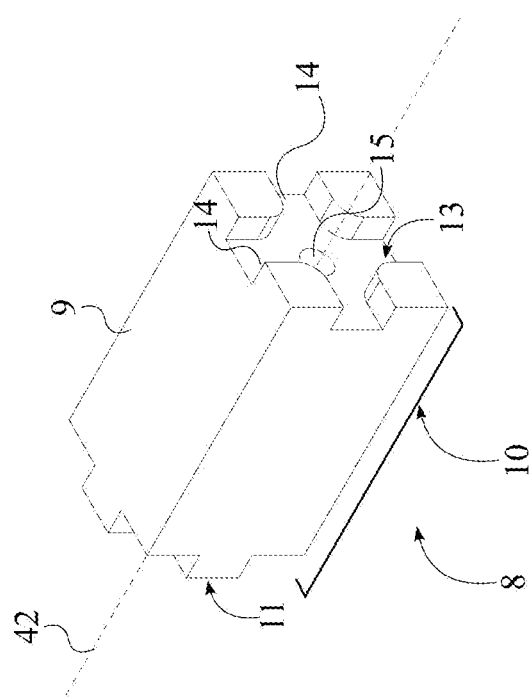
FIG. 3 is a perspective view showing the single joining feature within one of the frame member, wherein the viewed joining feature is the female interlocking portion.

In reference to FIG. 2-4, the plurality of frame members 8 comprises a set of first spacers 27 and a set of second spacers 28, wherein the at least one joining feature 10 is a single joining feature. The male interlocking portion 11 and the female interlocking portion 13 of the single joining feature are oppositely positioned of each other along the member body 9. More specifically, the male interlocking portion 11 and the female interlocking portion 13 are terminally positioned at the extremities of the member body 9, wherein the lateral shape of the member body 9 maintains a continues profile throughout the length of the member body 9. A fastening channel 15 of the at least one joining feature 10 is concentrically positioned with the male interlocking portion 11 and the female interlocking portion 13 and traversed along the member body 9 from the male interlocking portion 11 and the female interlocking portion 13. In other words, the fastening channel 15 is extended along the length of the member body 9 as the fastening channel 15 is utilized during the assembly process of the present invention.

Figure 5:
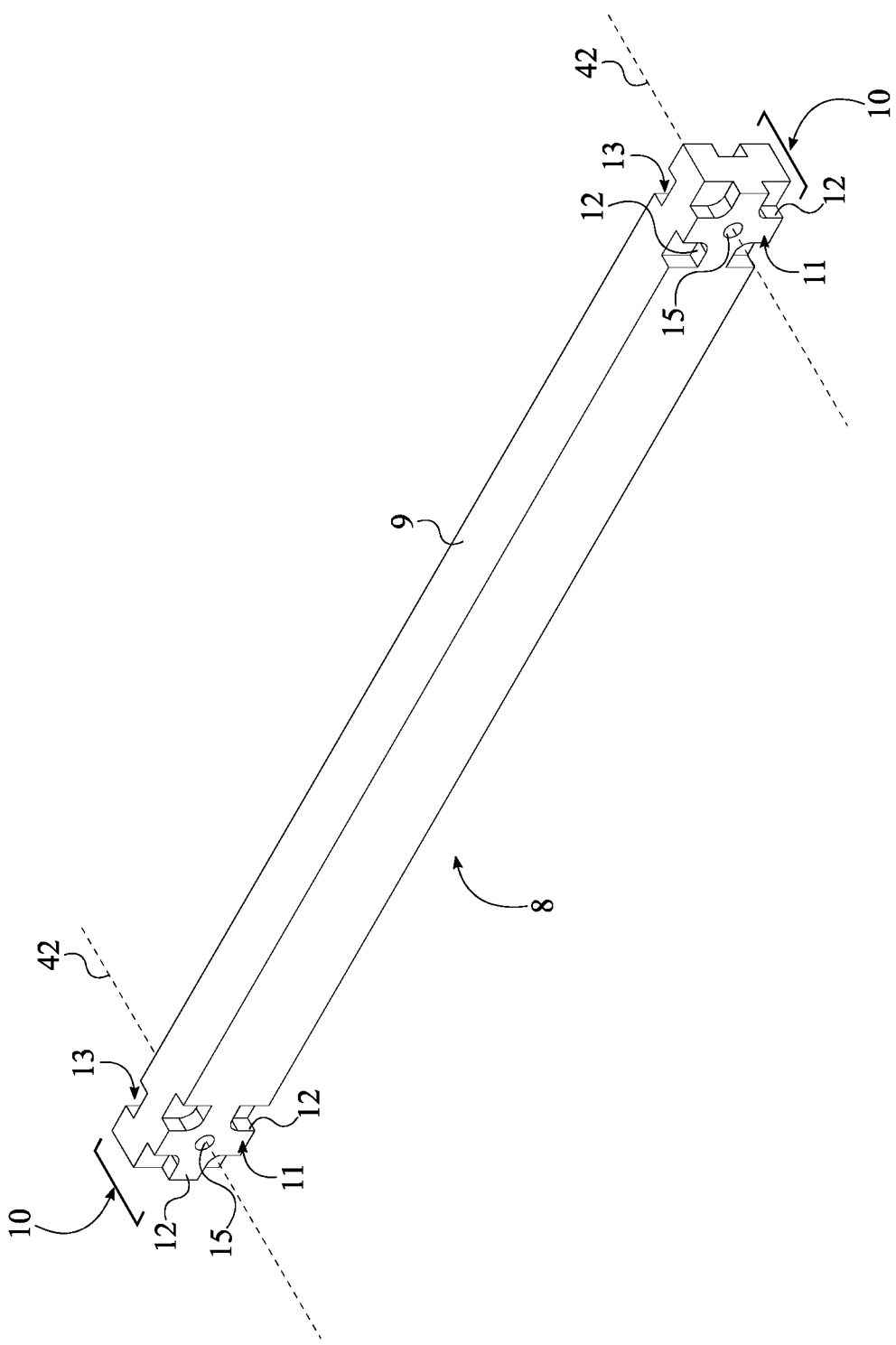
FIG. 5 is a perspective view showing the multiple joining features within one of the frame members, wherein the viewed joining features are the male interlocking portions.
Figure 6:
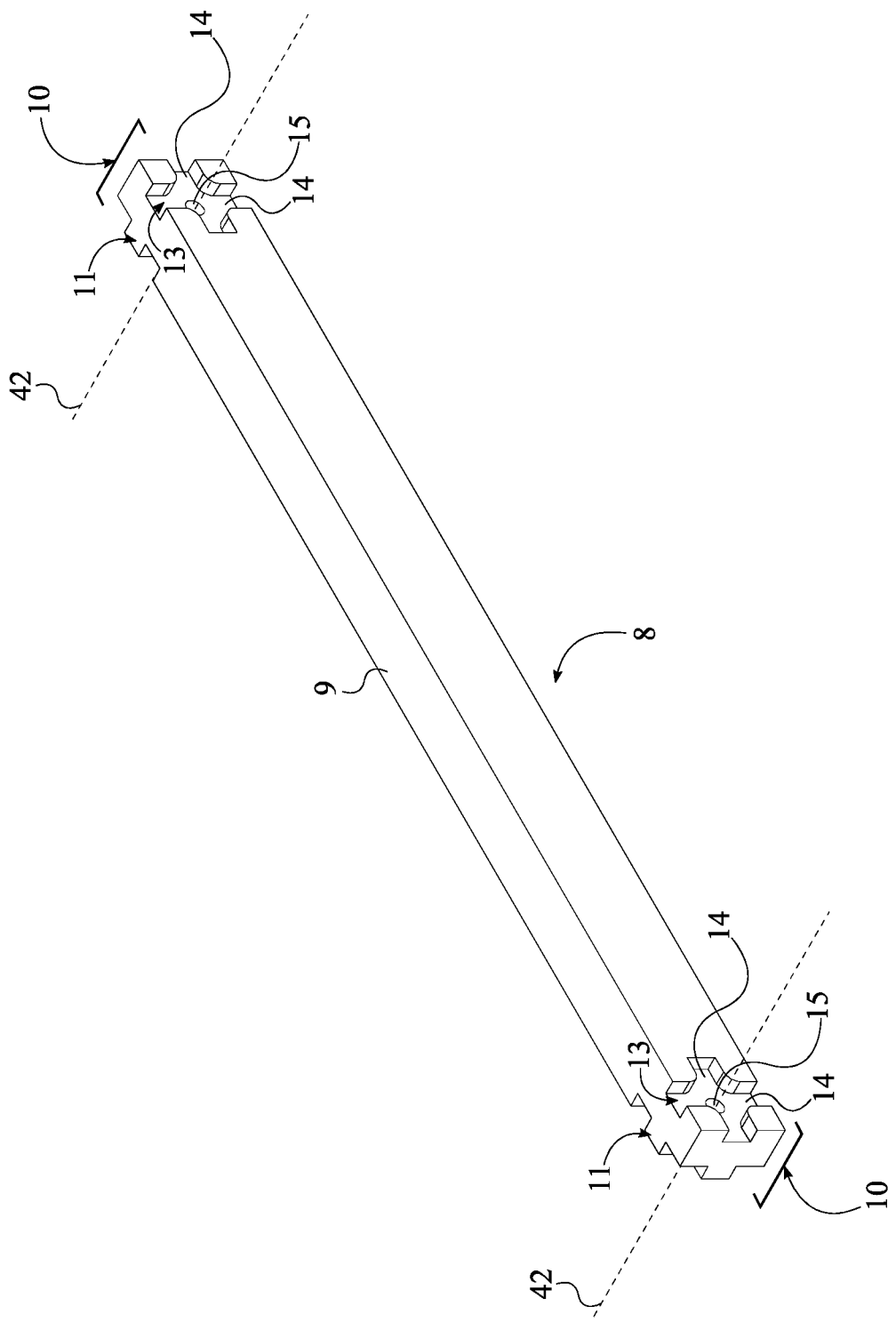
FIG. 6 is a perspective view showing the multiple joining features within one of the frame member, wherein the viewed joining features are the female interlocking portions.

In reference to FIG. 2, FIG. 5, and FIG. 6, the plurality of frame members 8 comprises a first beam 23, a second beam 24, a first column 25, and a second column 26, wherein the at least one joining feature 10 is a plurality of joining features. The male interlocking portion 11 and the female interlocking portion 13 of the plurality of joining features are oppositely positioned of each other about the member body 9 and evenly distributed along the member body 9. More specifically, the male interlocking portion 11 and the female interlocking portion 13 are laterally positioned along the member body 9 and oppositely positioned of each other. As a result, the male interlocking portion 11 and the female interlocking portion 13 collectively delineate one of the plurality of joining features within the first beam 23, the second beam 24, the first column 25, and the second column 26. The fastening channel 15 is concentrically positioned with the male interlocking portion 11 and the female interlocking portion 13 and traverses about the member body 9 from the male interlocking portion 11 and the female interlocking portion 13. In other words, the fastening channel 15 is perpendicularly extended about the length of the member body 9 as the fastening channel 15 is utilized during the assembly process of the present invention.

Figure 7A:
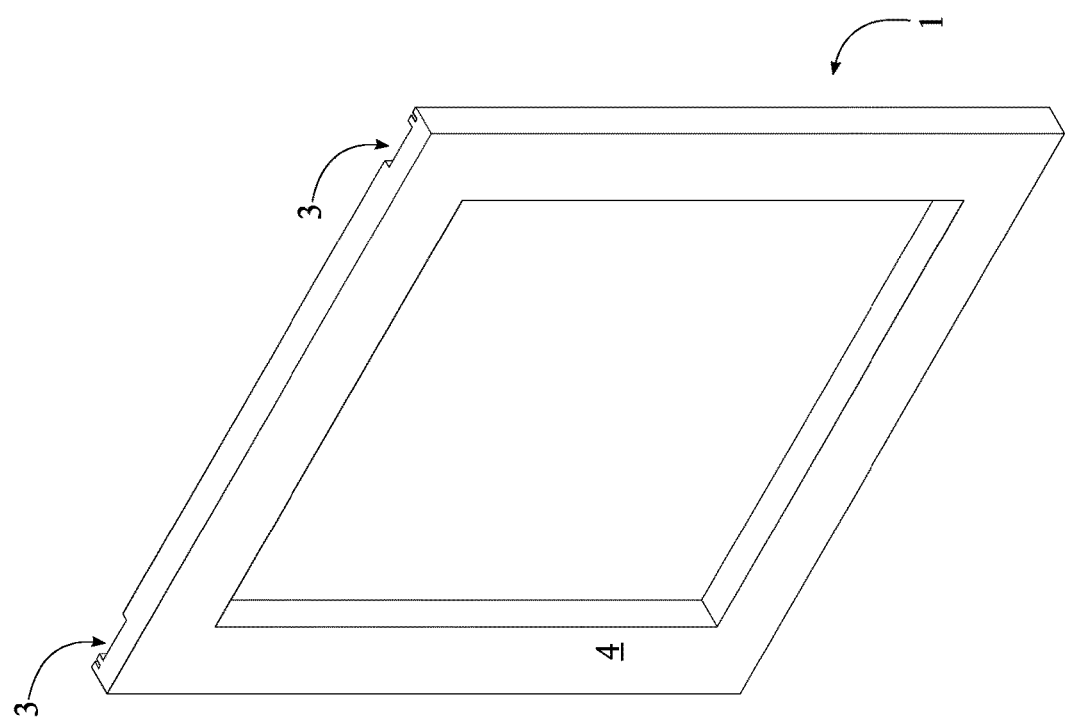
FIG. 7A is a front perspective view of the first face frame.
Figure 7B:
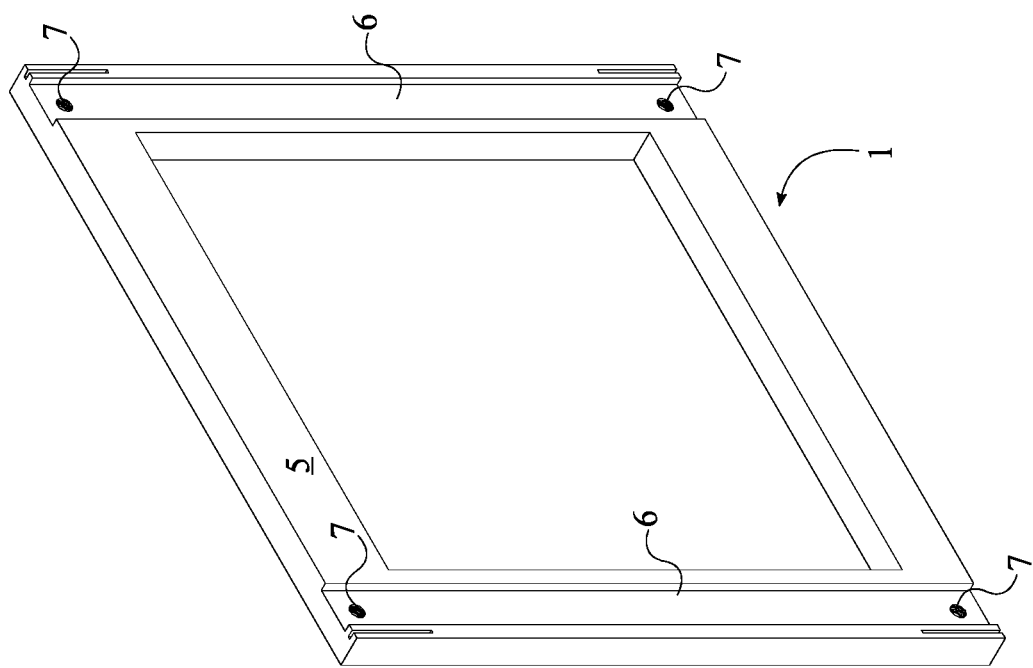
FIG. 7B is a rear perspective view of the first face frame.
Figure 8A:
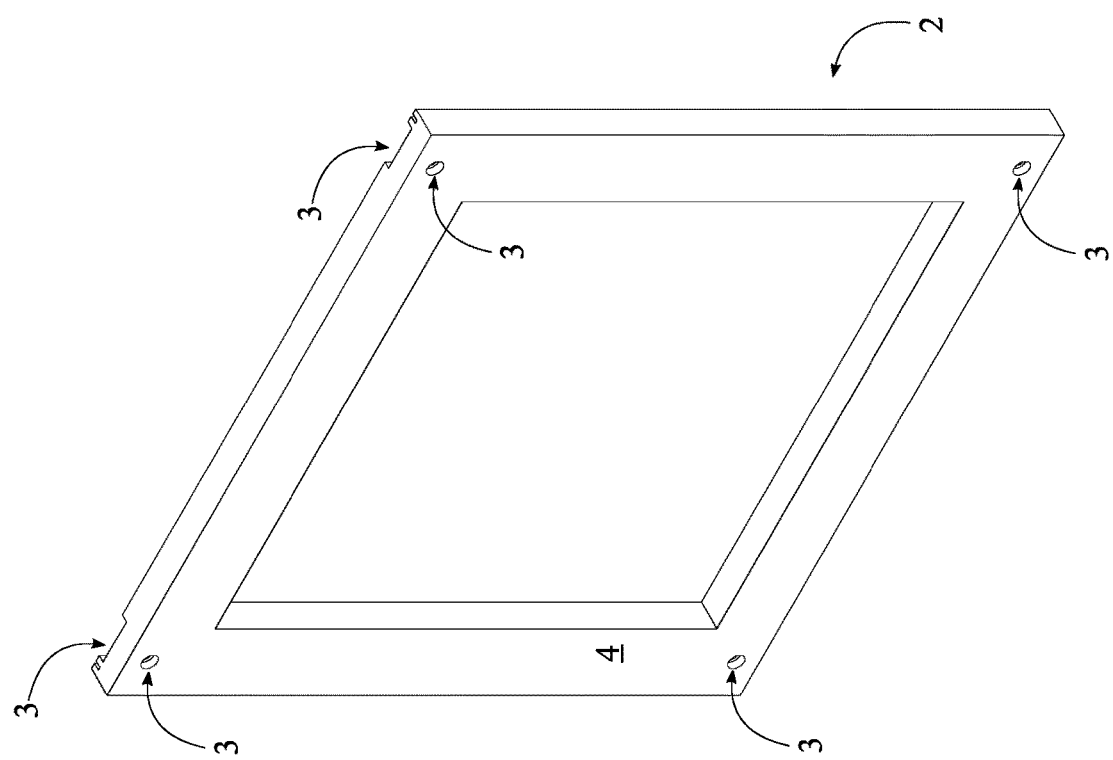
FIG. 8A is a front perspective view of the second face frame.
Figure 8B:
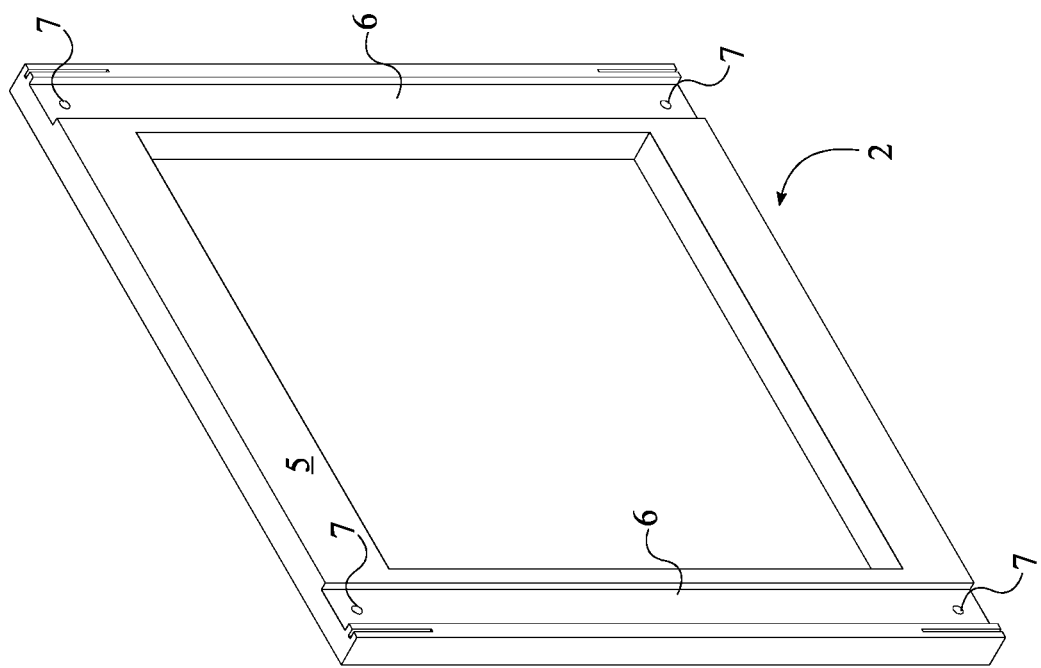
FIG. 8B is a rear perspective view of the second face frame.

The first face frame 1 and the second face frame 2 function as front and back structural supports to the skeletal configuration while providing an aesthetic appearance for the specific furniture item. The plurality of assembly features 3 for the first face frame 1 and the second face frame 2 comprises a pair of dadoes 6 and a plurality of locking channels 7. In reference to FIGS. 7A, 7B. 8A, and 8B, the pair of dadoes 6 engages with the plurality of frame members 8. More specifically, the pair of dadoes 6 respectively traverses into the first face frame 1 and the second face frame 2 from a rear surface 5 of the first face frame 1 and a rear surface 5 of the second face frame 2. The pair of dadoes 6 extends from a top edge to a bottom edge of the first face frame 1 and the second face frame 2. Resultantly, the pair of dadoes 6 can be engaged with each of the plurality of frame members 8. In reference to FIG. 7-8, the locking channels 7 provide further structural support for the overall profile of the at least one joining feature 10. More specifically, the locking channels 7 traverse the first face frame 1 from the pair of dadoes 6 and from a rear surface 5 of the first face frame 1. Similarly, the locking channels 7 traverse from a front surface 4 of the second face frame 2 into the pair of dadoes 6 of the second face frame 2. In other words, each locking channel 7 is positioned about each corner of the first face frame 1 and the second face frame 2 and centrally positioned about the pair of dadoes 6 for the first face frame 1 and the second face frame 2 so that the locking channels 7 can be interconnected into the fastening channel 15 during the assembly process of the present invention.

Figure 9:
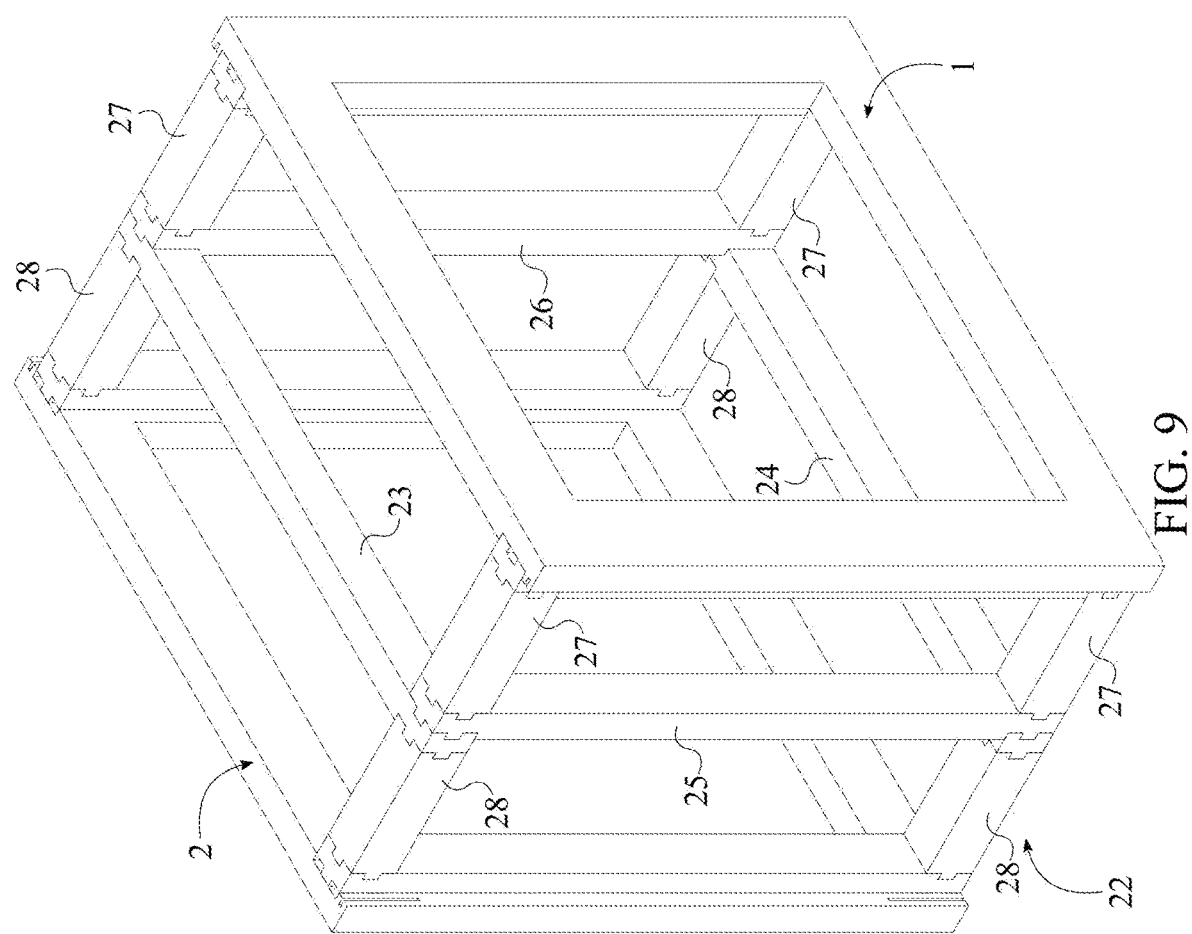
FIG. 9 is a perspective view of the present invention, wherein the skeletal configuration is a single support frame.

In reference to FIG. 9, the skeletal configuration of the present invention can be a single support frame 22 as the single support frame 22 comprises the first beam 23, the second beam 24, the first column 25, the second column 26, the set of first spacers 27, and the set of second spacers 28. More specifically, the first beam 23, the second beam 24, the first column 25, and the second column 26 are connected to each other and delineate a tubular shaped for the single support frame 22. Even through the preferred embodiment of the present invention is a rectangular shape, the present invention can be formed into an isosceles trapezoid as the male interlocking portion 11 and the female interlocking portion 13 regulate specific angle between the respective connecting frame members 8. Once the single support frame 22 is assembled, the first beam 23, the second beam 24, the first column 25, and the second column 26 are engaged to the first face frame 1 with the set of first spacers 27 and an additional pair of columns that are similar to the first column 25 and the second column 26 of the single support frame 22.

Additionally, the first beam 23, the second beam 24, the first column 25, and the second column 26 are also engaged to the second face frame 2 with the set of second spacers 28 and another additional pair of columns that are similar to the first column 25 and the second column 26 of the single support frame 22. Resultantly, the first face frame 1 and the second face frame 2 complete the front face-side and the back face-side of the specific furniture item partially covering the single support frame 22.

Figure 10:
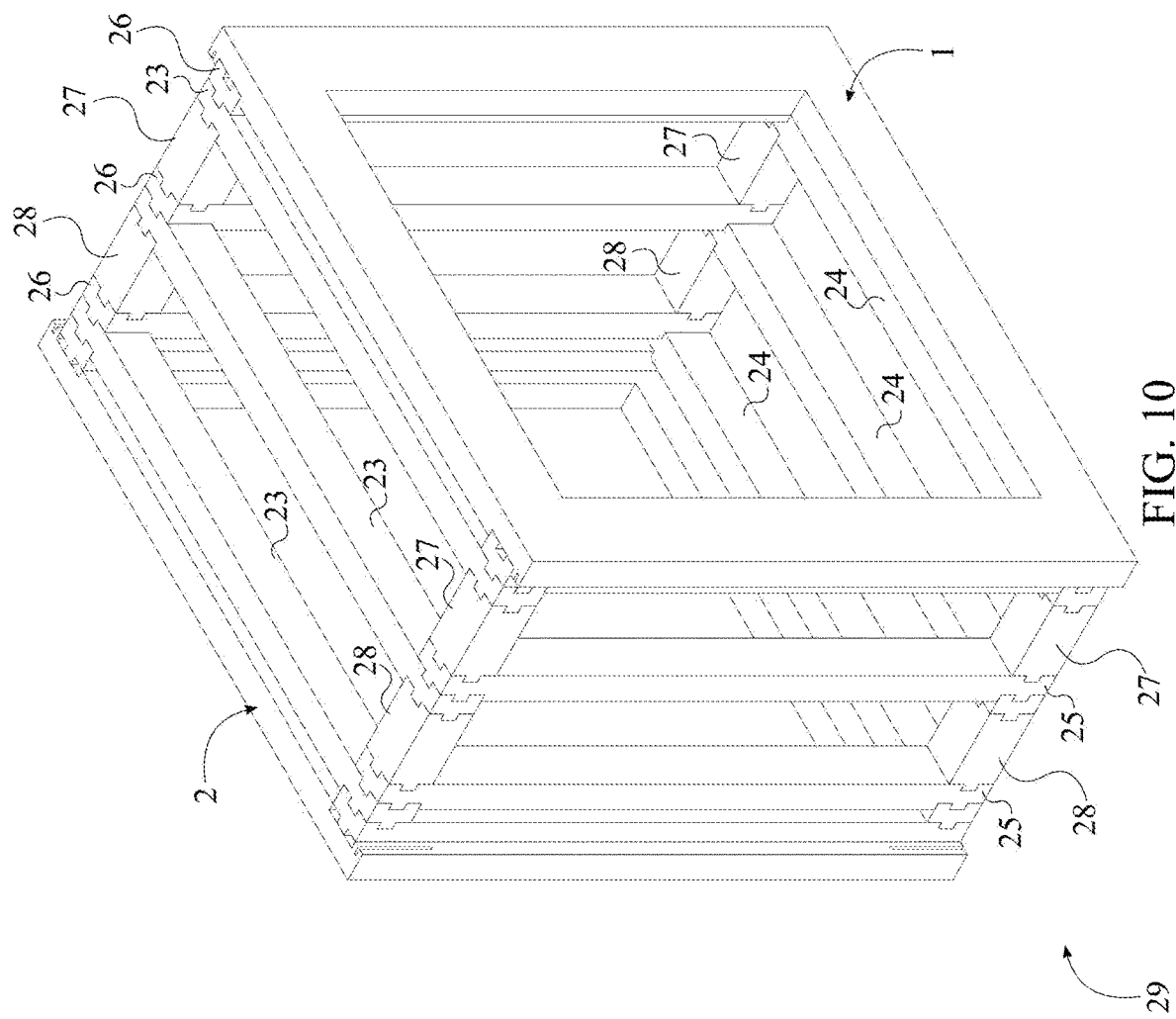
FIG. 10 is a perspective view of the present invention, wherein the skeletal configuration is a plurality of support frames.

In reference to FIG. 10, the skeletal configuration of the present invention can be a plurality of support frames 29. The plurality of support frames 29 comprises a first outer frame 30, a second outer frame 31, and at least one intermediary frame 32 as each support frame 29 comprises the first beam 23, the second beam 24, the first column 25, and the second column 26. The at least one intermediary frame 32 further comprises the set of first spacers 27 and the set of second spacers 28. More specifically, the first beam 23, the second beam 24, the first column 25, and the second column 26 are connected to each other and delineate a tubular shaped for each of the plurality of support frames 29. Even through the preferred embodiment of the present invention is a rectangular shape, the present invention can be formed into a square shape or an isosceles trapezoid as the male interlocking portion 11 and the female interlocking portion 13 regulate specific angle between the respective connecting frame members 8. Once the plurality of support frames 29 is individually assembled, the first outer frame 30 is engaged to the at least one intermediary frame 32 with the set of first spacers 27. The second outer frame 31 is engaged to the at least one intermediary frame 32 with the set of second spacers 28 and positioned opposite of the first outer frame 30. The first face frame 1 is engaged to the first outer frame 30 and positioned opposite of the at least one intermediary frame 32. Similarly, the second face frame 2 is engaged to the second outer frame 31 and positioned opposite of the at least one intermediary frame 32. More specifically, the first face frame 1 utilizes the first column 25 and the second column 26 of the first outer frame 30 or additional spacers that are similar to the set of first spacers 27 so that the first face frame 1 can be engaged with the first outer frame 30. The second face frame 2 utilizes an additional pair of columns that are similar to the first column 25 and the second column 26 of the second outer frame 31 or additional spacers that are similar to the set of second spacers 28 so that the second face frame 2 can be engaged with the second outer frame 31. Resultantly, the first face frame 1 and the second face frame 2 complete the front face-side and the back face-side of the specific furniture item partially covering the plurality of support frames 29.

Figure 11:
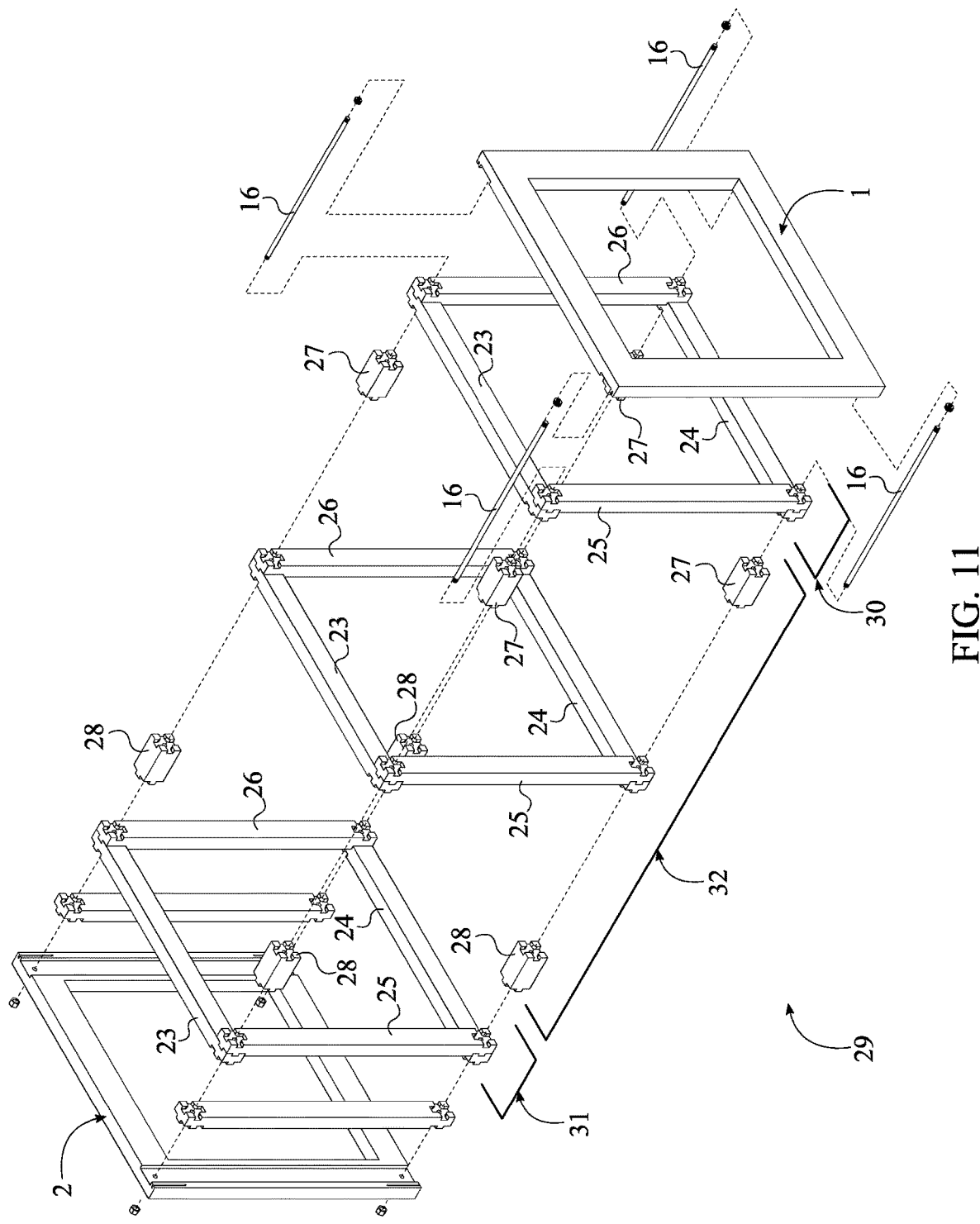
FIG. 11 is a partial exploded view for the plurality of support frames of the present invention
Figure 17:
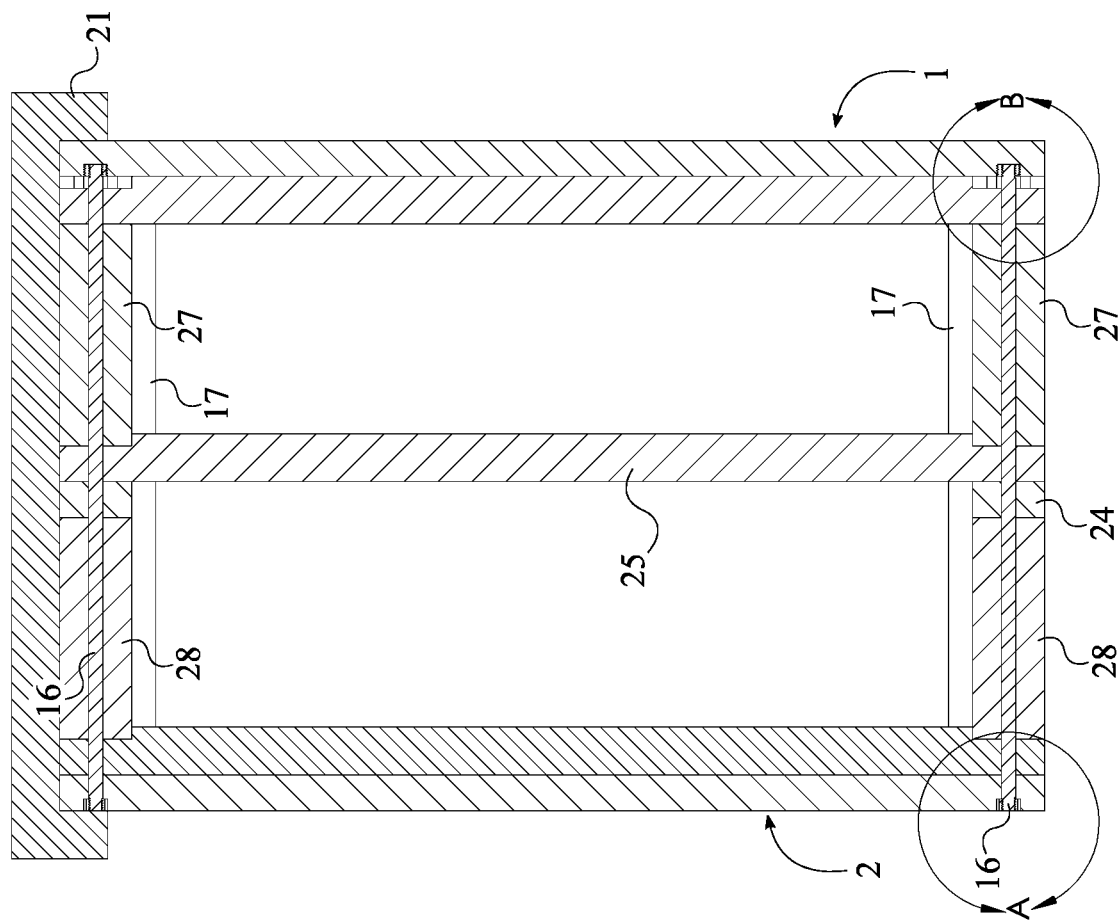
FIG. 17 is a cross section view of the present invention showing along a pair of fasteners of the present invention, showing the assembly of each fastener.
Figure 18:
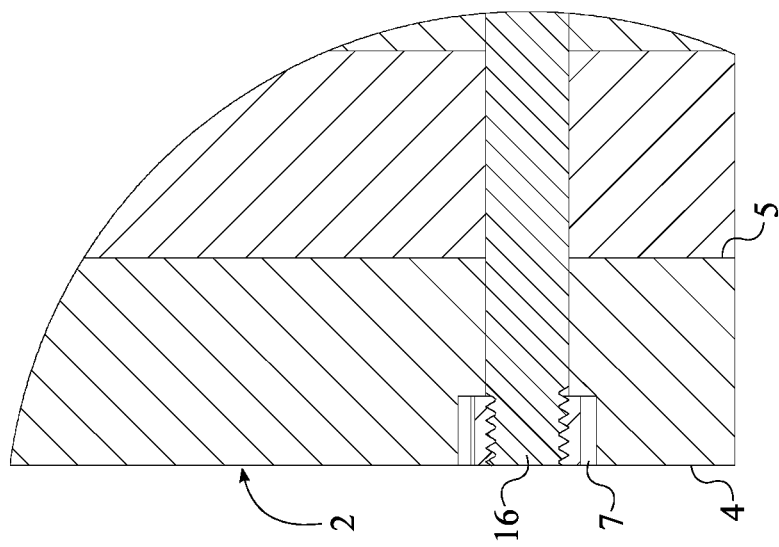
FIG. 18 is a detailed view of the present invention showing the fastener positioning with respect to the second face frame.
Figure 19:
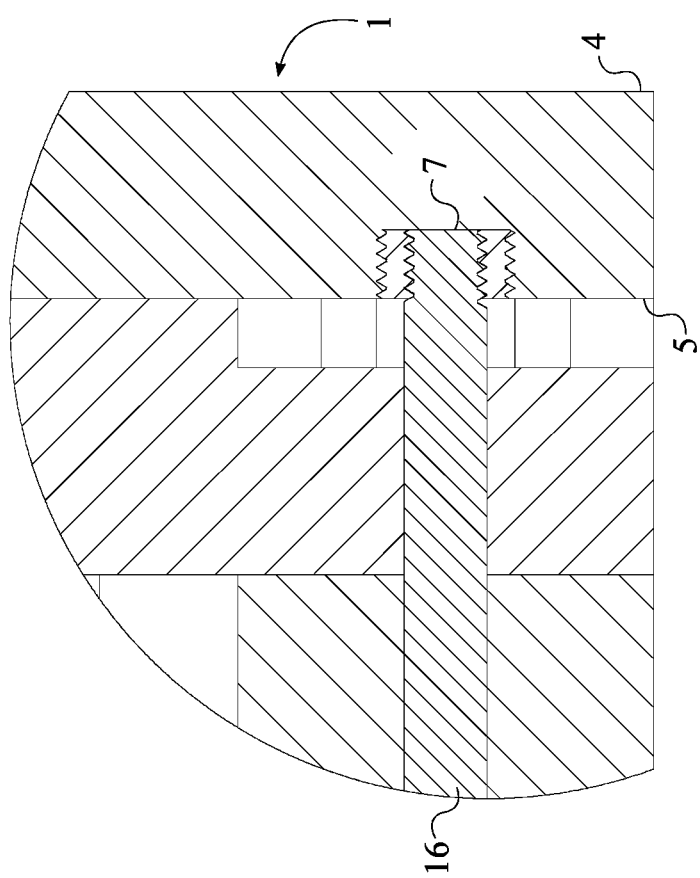
FIG. 19 is a detailed view of the present invention showing the fastener positioning with respect to the second face frame.

The present invention further comprises a fastener 16 that is concentrically positioned within the fastening channel 15 for each frame member 8 and positioned concentric with the locking channels 7 of the first face frame 1 and the second face frame 2 as shown in FIGS. 2 and 11. The fastener 16 preferably comprises a self-tapping threaded insert nut, a stud bolt, and a nut to provide an aesthetic and functional fastening system within the present invention. In reference to the single support frame 22, each frame member 8 is mounted to first face frame 1 and the second face frame 2 by the fastener 16 at each corner of the tubular shaped. In reference to the plurality of support frames 29, each frame member 8 is mounted to first face frame 1 and the second face frame 2 by the fastener 16 at each corner of the tubular shaped. More specifically, the fastening channel 15 for each frame member 8 aligns with each other and the concentric locking channels 7 for the first face frame 1 and the second face frame 2 at each corner of the tubular shaped. Resultantly, the fastening channel 15 for each frame members 8 and the concentric locking channels 7 for the first face frame 1 and the second face frame 2 delineate a continuous channel so that the bolt can be concentrically inserted. In reference to FIG. 17-19, the self-tapping threaded inset nut threadly and externally engages with each of the locking channels 7 of the first face frame 1 from the rear surface 5. A first end of the stud bolt is then threadly engaged with the self-tapping threaded insert nut from the inside while the plurality of frame members 8 and the second face frame 2 enclose a shaft portion of the stud bolt. The nut is positioned concentric with the locking channel 7 of the second face frame 2 and positioned flush with the front surface 4 of the second face frame 2 so that the nut can be threadly engaged with a second end of the stud bolt. Resultantly, when the nut can be accessed and tighten from the front surface 4 of the second face frame 2, wherein the tightening process of the nut further tighten the stud bolt and the self-tapping threaded insert nut.

Figure 12:
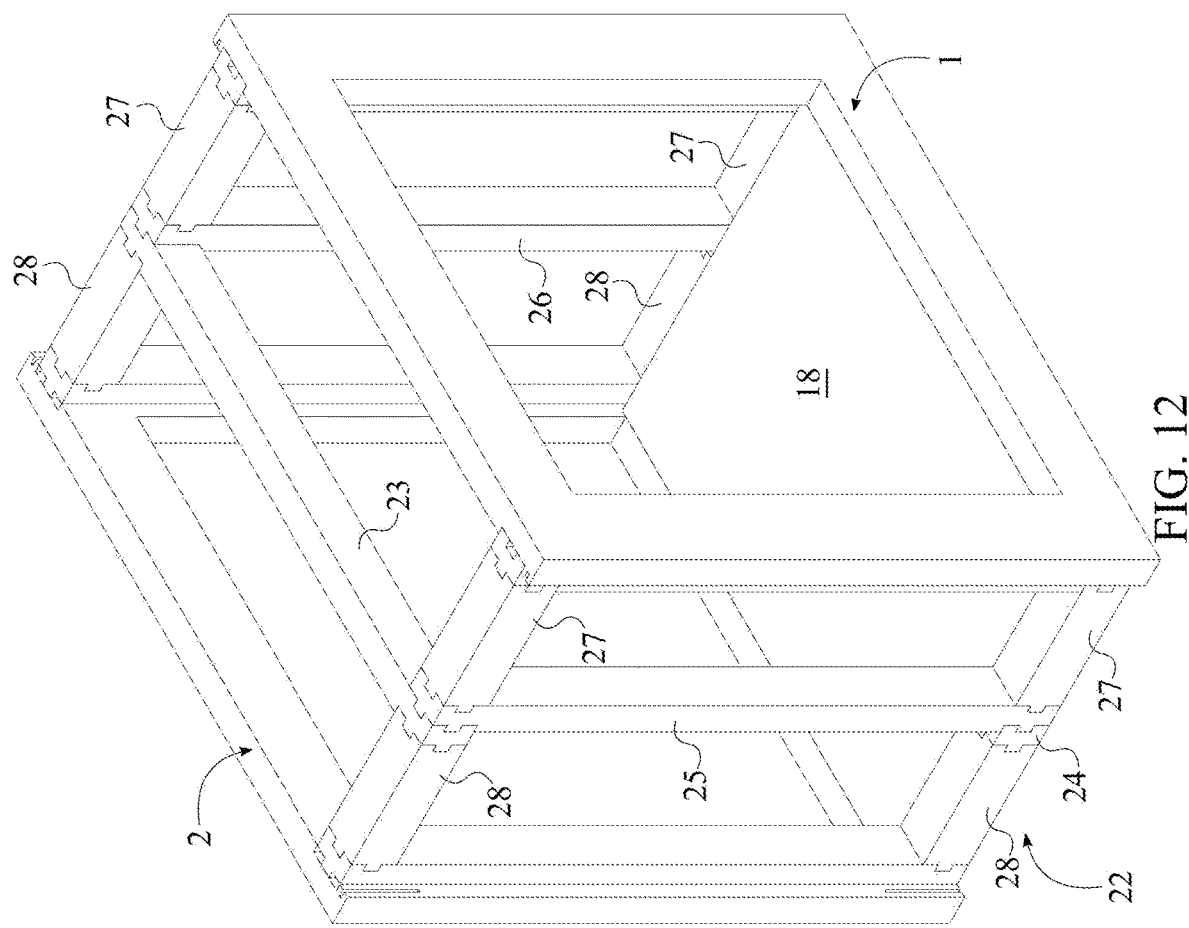
FIG. 12 is a perspective view of the present invention showing the shelf liner.

The present invention further comprises a floor liner 18 as shown in FIG. 12, preferably a wood panel, that is internally positioned with the specific furniture item in order to create a shelf. In reference to the single support frame 22, the floor liner 18 is positioned in between the first column 25 and the second column 26 so that the floor liner 18 can be connected to the second beam 24, the first face frame 1, and the second face frame 2. Since the floor liner 18 is connected atop the second beam 24, the actual placement of the second beam 24 with respect to the first column 25 and the second column 26 determines the exact vertical placement of the shelf. In reference to the plurality of support frames 29, the floor liner 18 is positioned in between the first column 25 and the second column 26 of each support frame 29 so that the floor liner 18 can be connected to the second beam 24 of each support frame 29, the first face frame 1, and the second face frame 2. Since the floor liner 18 is connected atop the second beam 24 of each support frame 29, the actual placement of the second beams 24 with respect to the first columns 25 and the second columns 26 determines the exact vertical placement of the shelf.

Figure 13:
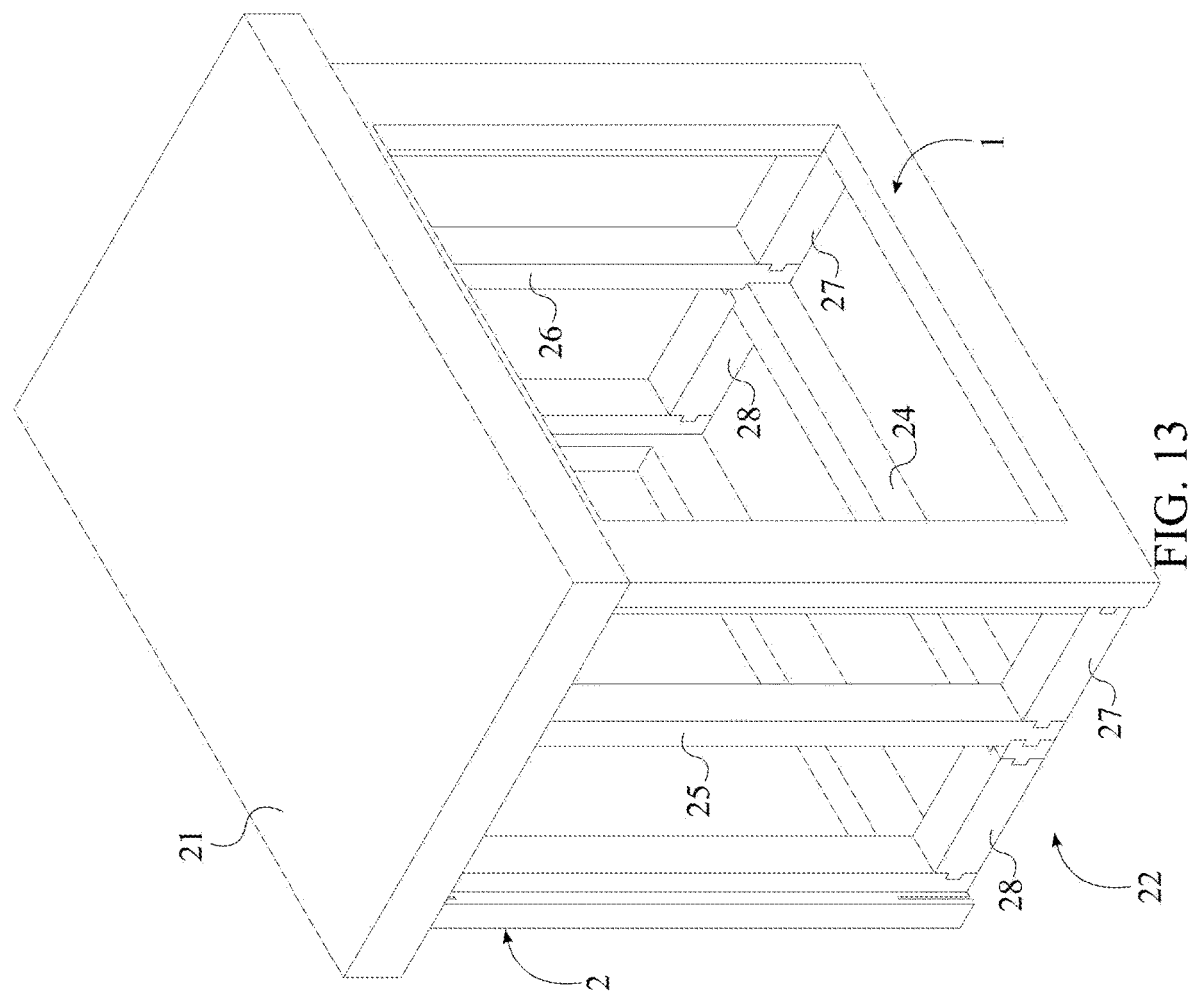
FIG. 13 is a perspective view of the present invention showing the top.

The present invention further comprises a top 21 that allows the specific furniture item to transforms into different styles of furniture such as, a bench, a table, a coffee table. In reference to FIG. 13, the top 21 is preferably positioned atop the skeletal configuration so that the skeletal configuration can be transformed into the aforementioned specific furniture items. In reference to the single support frame 22, the top 21 is attached to the first beam 23, the first face frame 1, and the second face frame 2 as the top 21 is positioned opposite of the second beam 24. In reference to the plurality of support frames 29, the top 21 is attached to the first beam 23 of each support frame 29, the first face frame 1, and the second face frame 2 as the top 21 is positioned opposite of the second beam 24 of each support frame 29.

Figure 14:
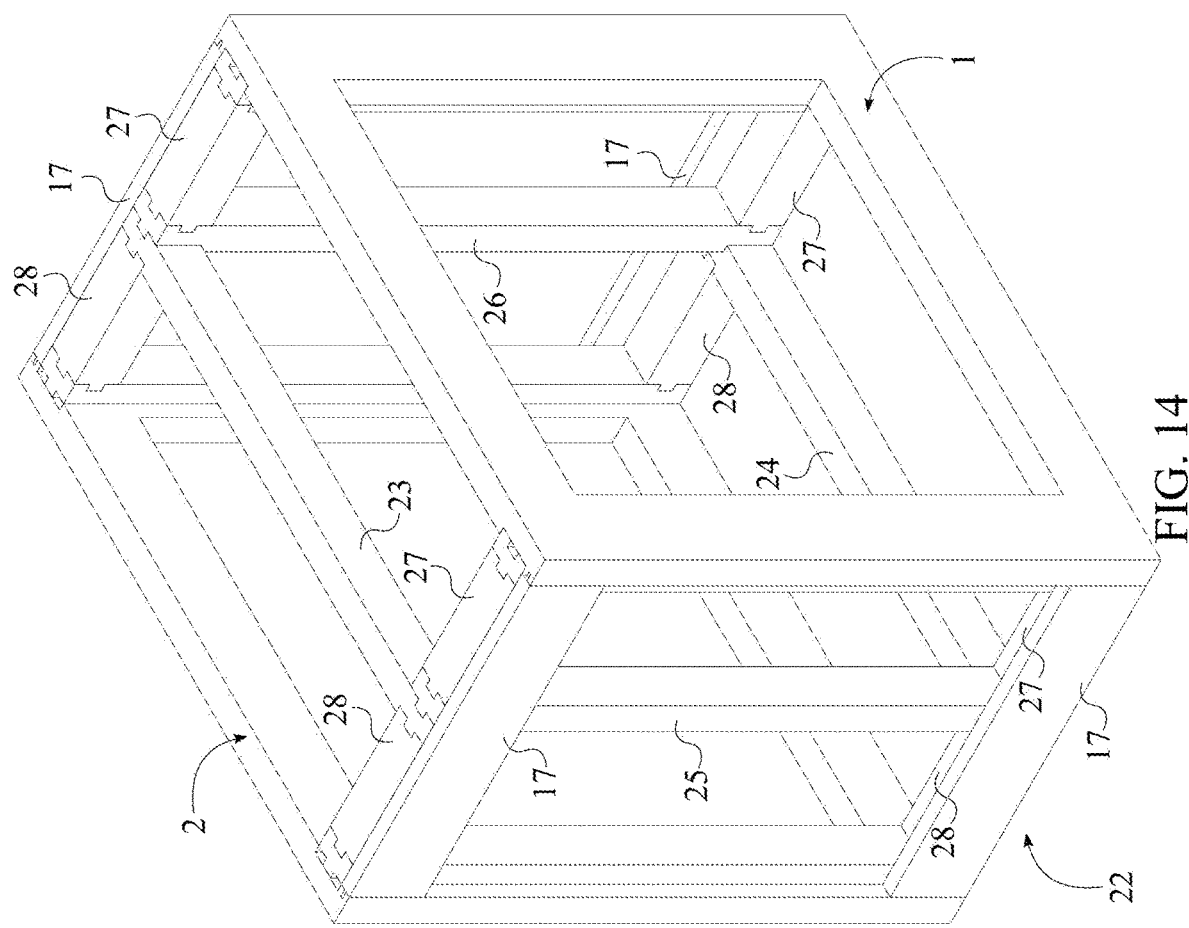
FIG. 14 is a perspective view of the present invention showing the plurality of side rails.

The present invention further comprises a plurality of side rails 17 in order to provide additional structural supports and esthetic looks for the embodiment as shown in FIG. 14. More specifically, each side rail 17 is externally positioned along the at least one joining feature 10 of the plurality of frame members 8. Each side rail 17 is engaged between the first face frame 1 and the second face frame 2 and positioned across the plurality of frame members 8. For example, a pair of side rails 17 are shown within each side of the embodiment wherein the pair of side rails 17 laterally covers the first column 25 and the second column 26.

Figure 15:
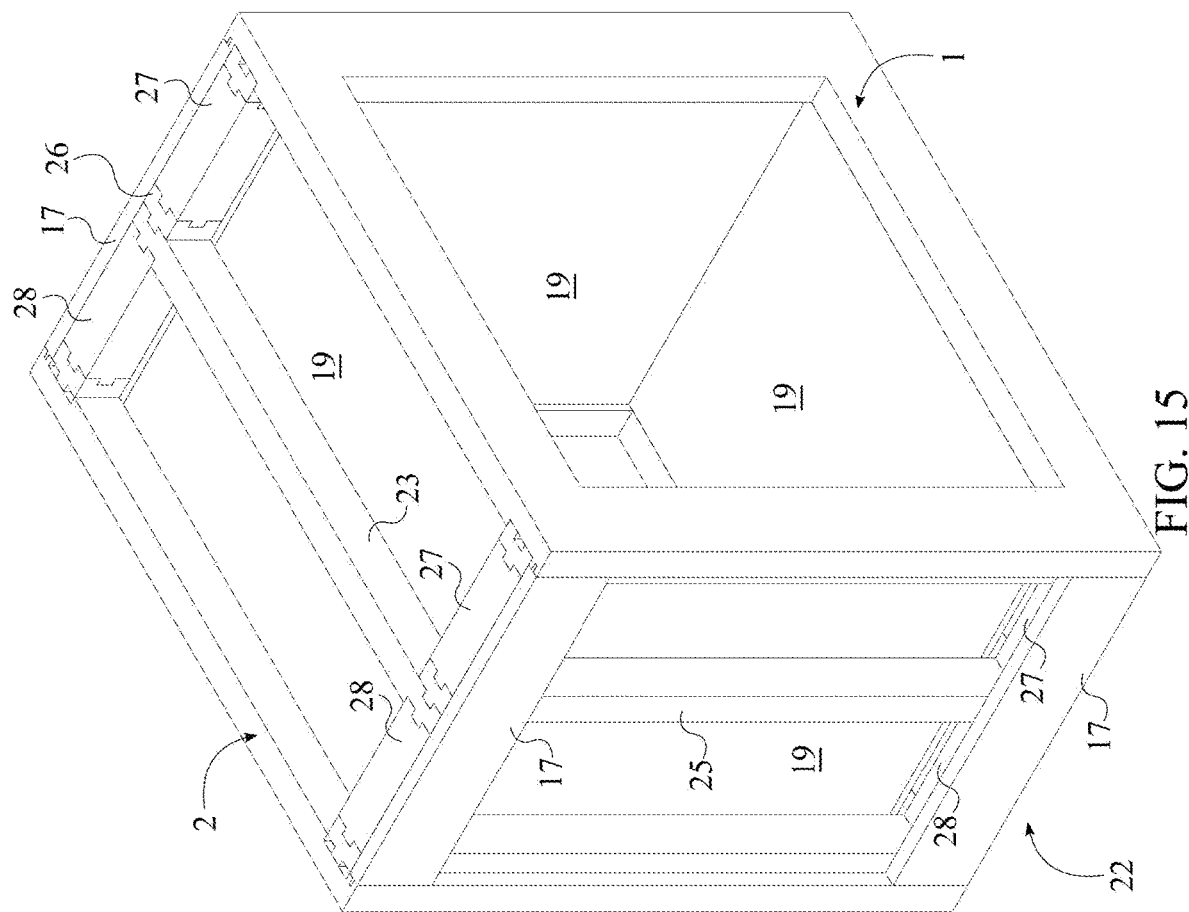
FIG. 15 is a perspective view of the present invention showing only the inner liners.
Figure 16:
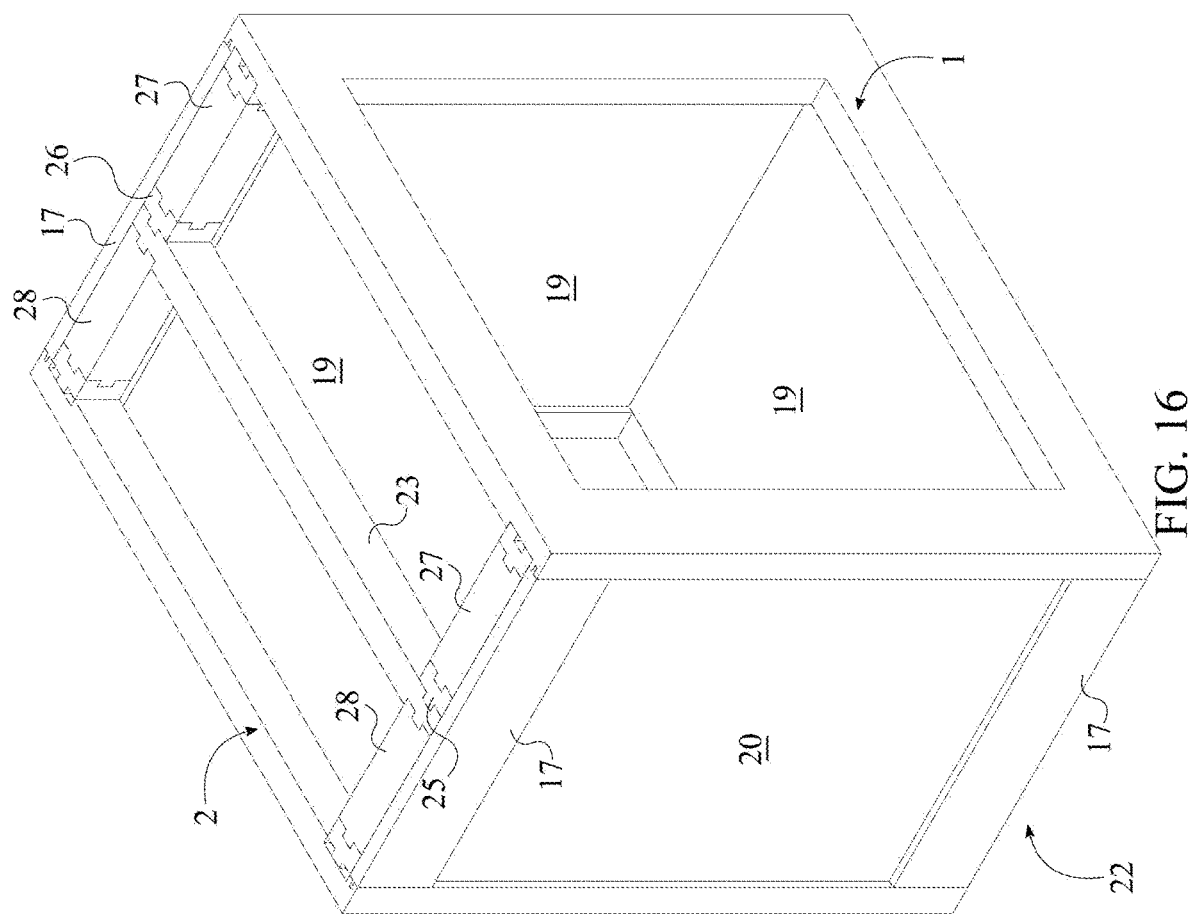
FIG. 16 is a perspective view of the present invention showing the inner liners and one of the outer panel.

The present invention further comprises at least one inner liner 19 and at least one outer panel 20 that allow the present invention to be transformed into an enclosed furniture item. In reference to the single support frame 22 as shown in FIG. 15-16, the inner liner 19 is internally positioned to the single support frame 22, in between the first face frame 1 and the second face frame 2, and laterally connected to at least one of the plurality of frame members 8, the face frame 1, and the second face frame 2. The outer panel 20 is externally positioned to the single support frame 22, in between the first face frame 1 and the second face frame 2, and laterally connected to at least one of the plurality of frame members 8, the face frame 1, and the second face frame 2, and the plurality of side rails 17. In reference to the plurality of support frames 29, the inner liner 19 is internally positioned to the plurality of support frames 29, in between the first face frame 1 and the second face frame 2, and laterally connected to at least one of the plurality of frame members 8, the face frame 1, and the second face frame 2. The outer panel 20 is externally positioned to the plurality of support frames 29, in between the first face frame 1 and the second face frame 2, and laterally connected to at least one of the plurality of frame members 8, the face frame 1, and the second face frame 2, and the plurality of side rails 17. Since a single inner liner 19 and a single outer panel 20 only cover one side of the skeletal configuration, the users of the present invention can determine the number of inner liners 19 and outer panels 20 that is required for a specific embodiment of the present invention. For examples, a partially enclosed embodiment of the present invention may comprise two inner liners 19 and two outer panels 20 as each inner liner 19 and the outer panel 20 jointly cover two sides of the skeletal configuration. However, a fully enclosed embodiment of the present invention may comprise four inner liners 19 and four outer panels 20 as each inner liner 19 and the outer panel 20 mutually cover all for sides of the skeletal configuration.

In reference to FIG. 3-6, the male interlocking portion 11 comprises a plurality of rails 12 and a center axis 42, wherein the plurality of rails 12 is radially distributed the center axis 42 of the male interlocking portion 11. Similarly, the female interlocking portion 13 comprises a plurality of channels 14 and a center axis 42, wherein the plurality of rails 12 is radially distributed the center axis 42 of the female interlocking portion 13. In reference to the preferred embodiment, each of the plurality of rails 12 and each of the plurality of channels 14 are formed into a square shape so that the plurality of rails 12 and the plurality of channels 14 can be vertically and horizontally interlocked into each other forming a stable joint. Optionally, the plurality of rails 12 and the plurality of channels 14 can also be formed into other geometric shapes including, but not limited to, a cross shape, a single square shape, a vertical rectangle shape, and a horizontal rectangle shape.

Although the invention has been explained in relation to its preferred embodiment, it is to be understood that many other possible modifications and variations can be made without departing from the spirit and scope of the invention as hereinafter claimed.

What is claimed is:

1. A furniture frame structural system with interlocking members comprising:
   a first face frame;
   a second face frame;
   a plurality of frame members;
   a plurality of side rails;
   each of the plurality of frame members comprising a member body and at least one joining feature;
   the at least one joining feature comprising a male interlocking portion and a female interlocking portion;
   the plurality of frame members being arranged into a skeletal configuration;
   the male interlocking portion for each of the plurality of frame members being engaged to the female interlocking portion of an adjacent member from the plurality of frame members;
   the first face frame being engaged and attached to the plurality of frame members by a plurality of assembly features of the first face frame;
   the second face frame being engaged and attached to the plurality of frame members by a plurality of assembly features of the second face frame, opposite of the first face frame;
   the plurality of assembly features for the first face frame and the second face frame each comprising a pair of dadoes;
   the pair of dadoes traversing into the first face frame from a rear surface of the first face frame;
   the pair of dadoes traversing into the second face frame from a rear surface of the second face frame;
   each side rail being externally positioned along the at least one joining feature of the plurality of frame members;
   each side rail being engaged between the first face frame and the second face frame across the plurality of frame members;
   the plurality of assembly features for the first face frame and the second face frame each comprising a plurality of slots;
   the plurality of slots traversing into the first face frame from the rear surface of the first face frame adjacent to the pair of dadoes traversing into the first face frame from the rear surface of the first face frame;
   the plurality of slots traversing into the second face frame from the rear surface of the second face frame adjacent to the pair of dadoes traversing into the second face frame from the rear surface of the second face frame; and
   each side rail being engaged within a corresponding slot traversing into the first face frame and engaged within a corresponding slot traversing into the second face frame.

2. The furniture frame structural system with interlocking members as claimed in claim 1 comprising:
   the at least one joining feature being a single joining feature; and
   the male interlocking portion and the female interlocking portion of the single joining feature being oppositely positioned of each other along the member body.

3. The furniture frame structural system with interlocking members as claimed in claim 2 comprising:
   a fastening channel;
   the fastening channel traversing along the member body from the male interlocking portion to the female interlocking portion; and
   the fastening channel being concentrically positioned to the male interlocking portion and the female interlocking portion.

4. The furniture frame structural system with interlocking members as claimed in claim 1 comprising:
   the at least one joining feature being a plurality of joining features;
   the plurality of joining features being evenly distributed along the member body; and
   the male interlocking portion and the female interlocking portion of each joining feature being oppositely positioned of each other about the member body.

5. The furniture frame structural system with interlocking members as claimed in claim 4 comprising:
   a fastening channel;
   the fastening channel concentrically traversing about the member body from the male interlocking portion to the female interlocking portion; and
   the fastening channel being concentrically positioned to the male interlocking portion and the female interlocking portion.

6. The furniture frame structural system with interlocking members as claimed in claim 1 comprising:
   the plurality of assembly features for the first face frame and the second face frame each comprising a plurality of locking channels.

7. The furniture frame structural system with interlocking members as claimed in claim 6 comprising:
   the locking channels traversing into the first face frame from the pair of dadoes of the first face frame;
   the locking channels traversing from a front surface of the second face frame into the pair of dadoes of the second face frame; and each locking channel being positioned about a corner of the first face frame and the second face frame.

8. The furniture frame structural system with interlocking members as claimed in claim 1 comprising:
the skeletal configuration being a single support frame;
the single support frame comprising a first beam, a second beam, a first column, a second column, a set of first spacers, and a set of second spacers;
the first beam, the second beam, the first column, and the second column being connected to each other;
a tubular shape being delineated with the first beam, the second beam, the first column, and the second column;
the first beam, the second beam, the first column, and the second column being engaged to the first face frame with the set of first spacers; and
the first beam, the second beam, the first column, and the second column being engaged to the second face frame with the set of second spacers.

9. The furniture frame structural system with interlocking members as claimed in claim 8 comprising:
a fastener;
the at least one joining feature comprising a fastening channel;
each of the plurality of assembly features comprising a locking channel;
the fastener being concentrically positioned within the fastening channel for each frame member and the locking channel for the first face frame and the second face frame; and
each frame member of the single support frame being mounted to first face frame and the second face frame by the fastener at each corner of the tubular shape.

10. The furniture frame structural system with interlocking members as claimed in claim 8 comprising:
a floor liner;
the floor liner being positioned in between the first column and the second column; and
the floor liner being connected to the second beam, the first face frame, and the second face frame.

11. The furniture frame structural system with interlocking members as claimed in claim 8 comprising:
a top; and
the top being attached to the first beam, the first face frame, and the second face frame, opposite of the second beam.

12. The furniture frame structural system with interlocking members as claimed in claim 8 comprising:
at least one inner liner;
at least one outer panel;
the inner liner being internally positioned to the single support frame, in between the first face frame and the second face frame;
the inner liner being laterally connected to at least one of the plurality of frame members, the first face frame, and the second face frame;
the outer panel being externally positioned to the single support frame, in between the first face frame and the second face frame; and
the outer panel being laterally connected to at least one of the plurality of frame members, the first face frame, the second face frame, and the plurality of side rails.

13. The furniture frame structural system with interlocking members as claimed in claim 1 comprising:
the skeletal configuration being a plurality of support frames;
the plurality of support frames comprising a first outer frame, a second outer frame, and at least one intermediary frame;
each support frame comprising a first beam, a second beam, a first column, a second column;
the at least one intermediary frame comprising a set of first spacers and a set of second spacers;
the first beam, the second beam, the first column, and the second column being connected to each other;
a tubular shape being delineated with the first beam, the second beam, the first column, and the second column;
the first outer frame being engaged to the at least one intermediary frame with the set of first spacers;
the second outer frame being engaged to the at least one intermediary frame with the set of second spacers, opposite of the first outer frame;
the first face frame being engaged to the first outer frame, opposite of the at least one intermediary frame; and
the second face frame being engaged to the second outer frame, opposite of the at least one intermediary frame.

14. The furniture frame structural system with interlocking members as claimed in claim 13 comprising:
a fastener;
the at least one joining feature comprising a fastening channel;
each of the plurality of assembly features comprising a locking channel;
the fastener being concentrically positioned within the fastening channel for each frame member and the locking channel for first face frame and the second face frame; and
each frame member of the plurality of support frames being mounted to first face frame and the second face frame by the fastener at each corner of the tubular shape.

15. The furniture frame structural system with interlocking members as claimed in claim 13 comprising:
a floor liner;
the floor liner being positioned in between the first column and the second column of each support frame; and
the floor liner being connected to the second beam of each support frame, the first face frame, and the second face frame.

16. The furniture frame structural system with interlocking members as claimed in claim 13 comprising:
a top;
the top being positioned opposite of the second beam of each support frame; and
the top being attached to the first beam of each support frame, the first face frame, and the second face frame.

17. The furniture frame structural system with interlocking members as claimed in claim 13 comprising:
at least one inner liner
at least one outer panel;
the inner liner being internally positioned to the plurality of support frames, in between the first face frame and the second face frame;
the inner liner being laterally connected to at least one of the plurality of frame members, the face frame, and the second face frame;
the outer panel being externally positioned to the plurality of support frames, in between the first face frame and the second face frame; and
the outer panel being laterally connected to at least one of the plurality of frame members, the first face frame, the second face frame, and the plurality of side rails.

18. The furniture frame structural system with interlocking members as claimed in claim 1 comprising:
   the male interlocking portion comprising a plurality of rails and a center axis; and
   the plurality of rails being radially distributed around the center axis.

19. The furniture frame structural system with interlocking members as claimed in claim 1 comprising:
   the female interlocking portion comprising a plurality of channels and a center axis; and
   the plurality of channels being radially distributed around the center axis.

* * * * *